United States Patent Office
3,445,278
Patented May 20, 1969

3,445,278
CHLOROSILYL SUBSTITUTED POLYMERS AS
WATERPROOFING AGENTS
Garth M. Stanton, Pinole, Calif., assignor to Chevron Research Company, San Francisco, Calif., a corporation of Delaware
No Drawing. Filed Nov. 15, 1965, Ser. No. 507,647
Int. Cl. C08h 19/02; B44d 1/28
U.S. Cl. 117—141
2 Claims

ABSTRACT OF THE DISCLOSURE

The invention is directed to novel polymeric silanes and their use for water proofing. The fabric to be waterproofed is impregnated with a polysilyl chloride substituted addition polymer of at least about 50,000 molecular weight and having about one silylchloro group per about 10 to 100 monomers and per about 100 to 2,000 carbons.

---

This invention concerns novel polymeric silanes and their use for waterproofing.

Waterproofing is commonly employed on a wide variety of materials to either protect the material from deterioration or in situations when the material is used as a cover—clothes or building materials—to provide a person or object with protection from water. Waterproofing is carried out with numerous cellulosic materials such as cotton fabrics, paper, wood, etc. Waterproofing is also used in soils and building materials: dikes are coated to prevent leakage and mud bricks may be coated to prevent deterioration or penetration and leaking.

For a satisfactory waterproofing material, it is necessary that the waterproofing material should remain bonded to the supporting material under the usual environmental conditions of the supporting material. For example, treated fabrics should retain the waterproofing during dry cleaning or washing, so that repeated treatments are not required.

Pursuant to this invention, polysilyl chloride substituted addition polymers are provided of at least about 50,000 molecular weight and having about one silylchloro ($\equiv$SiCl) group per about 10 to 100 monomers and per about 100 to 2,000 carbons. The silylchloro group is pendant from the chain and usually separated from the backbone of the polymer by at least 3 carbon atoms.

The molecular weight of the addition polymers will generally be in the range of about 50,000 to 1,000,000, more usually from about 100,000 to 500,000. The polymer will be a co- or higher polymer of olefins of at least 8 carbon atoms and a silylchloro substituted α-olefin, wherein the silylchloro group is at least γ to the olefinic unsaturation.

For the most part, the polymers of this invention will have a repeating unit of the following formula:

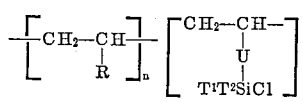

wherein n is an integer of from 10 to 100, usually 12 to 50, R is alkyl of from 6 to 20 carbon atoms, more usually of from 8 to 18 carbon atoms, U is alkylene of from 3 to 18 carbon atoms, more usually of from 8 to 18 carbon atoms, the silylchloro group is at least γ to the methine (CH) in the chain, but is more usually ω or ω-1 to the methine group and $T^1$ and $T^2$ are halogen of atomic number of from 17 to 35, bromine or chlorine, or a group which does not interfere with activity of the chlorine or the preparation of the product, such as lower alkyl, lower alkoxy, etc. Preferably, $T^1$ and $T^2$ are chlorine.

For the most part, the ratio of the number of carbon atoms per silylchloro group will be in the range of 100 to 2,000:1, more usually from 200 to 1,000:1.

The preferred polymers of this invention have the following recurring unit:

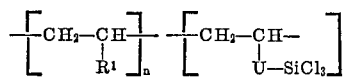

wherein n is an integer of from 12 to 50, $R^1$ is of from about 12 to 18 carbon atoms, and U is alkylene of from 6 to 18 carbon atoms.

The compositions of this invention are readily prepared by adding a chlorosilane having at least one hydrogen bonded to silicon to a copolymer of monoolefins of from 8 to 22 carbon atoms and monconjugated diolefins of from 5 to 22 carbons atoms, having at least one double bond in a terminal position; the ratio of monoolefin to diolefin in the polymer is in the range of about 10–100:1, more usually of from about 12–50:1. Such polymers and methods of their preparation are described in copending application No. 248,212, filed on Dec. 31, 1962.

The olefins are most conveniently polymerized with "Ziegler-type" catalysts. These catalysts generally include a transition metal compound such as the halide, oxide, oxyhalide or alkoxide of titanium or vanadium and an organometallo compound with a metal of Groups I to III of the Periodic Chart. Most conveniently, titanium trichloride, vanadium trichloride or oxychloride is combined with a trialkyl aluminum or dialkyl aluminum halide, such as triethyl aluminum, triisobutyl aluminum, diethyl aluminum chloride, or ethyl aluminum dichloride and an activator. These "Ziegler-type" catalysts are well known in the art and do not require extensive exemplification here. See for example, "Stereospecific Catalysis" beginning at page 93 in the Journal, Chemical Engineering for Apr. 2, 1962, McGraw-Hill Publishing Company, New York.

The copolymerization is conveniently carried out at temperatures from about 30° C. to about 150° C. at atmospheric pressure. The lower temperatures give copolymers of higher molecular weight. A hydrocarbon diluent such as toluene, xylene, petroleum naphtha, or mineral lubricating oil is commonly employed. The reaction time is ordinarily from about 0.5 to 10 hours. When the polymerization is completed, the reaction is stopped by quenching with an alcohol, thus deactivating the catalyst and precipitating the copolymer product from the inert hydrocarbon diluent.

The monoolefins used may be a single monoolefin or a mixture of monoolefins. Illustrative monoolefins include decene-1, dodecene-1, tetradecene-1, pentadecene-1, hexadecene-1, octadecene-1, eicosene-1, etc.

In the present invention, the preferred copolymers are derived from cracked wax olefin mixtures of (A) α-olefins of from about 10 to 22 carbon atoms and (B) diolefins of from about 8 to 20 carbon atoms. Such cracked wax olefin copolymers are described in copending application Ser. No. 248,282, filed Dec. 31, 1962.

The cracked wax olefin mixtures are suitably prepared by thermocracking of conventional refined paraffin waxes derived from typical waxy crude oils. While about 90 per cent by weight of the wax is normal paraffins, the balance of the wax composition is made up of isoparaffins, naphthenes and small proportions of aromatic hydrocarbons. The wax is cracked at temperatures of about 500° to about 600° F. with an exposure time of only a few seconds. The resulting distribution of olefins may then be distilled to separate into various fractions. For further description of the process see, for example, U.S. Patent No. 2,172,228.

The analysis of a typical cracked wax olefin mixture indicates the following distribution of products:

TABLE I

| | Weight percent |
|---|---|
| Straight-chain α-olefins | 89 |
| Straight-chain α, ω-diolefins | 5 |
| Straight-chain α-internal olefins | 1 |
| Branched-chain and napthenic hydrocarbons | 3 |
| Conjugated internal diolefins, etc. | 2 |

The resulting olefinic containing polymer may then be reacted by various means known in the art to form the silylchloro derivative. One common method is the use of a platinum catalyst. Silanes may also be added using free radical catalysts, such as benzoyl peroxide. Other methods using conventional synthetic techniques will readily present themselves to those skilled in the art. The preparative method for the polysilanes of this invention is not critical to the invention; any convenient means may be used.

When using a platinum catalyst such as chloroplatinic acid, an inert diluent will generally be used such as benzene, toluene, etc. The chlorosilane is added to the solution and a catalytic amount of the platinum catalyst added, the mixture being maintained at relatively mild temperatures, i.e., less than 50° C. Preferably, an excess of the chlorosilane is used in order to prevent side reactions which might lead to possible cross-linking of the polymer.

Various chlorosilanes which may be used include trichlorosilane, dichloromethylsilane, monochlorodimethylsilane, dichloroethoxysilane, dichloromethoxysilane, etc.

The following examples are offered by way of illustration and not by way of limitation.

Example A.—Preparation of the olefinic containing polymer

The catalyst is prepared by combining in a reaction flask under a nitrogen atmosphere, 75 ml. of dry heptane, 7.5 g. of titanium trichloride-AA and then 9.35 g. of triisobutyl aluminum in 75 ml. of heptane, while maintaining a temperature of 0° C.

To the preformed catalyst is then added 600 ml. of dry xylene, the mixture heated to reflux and 200 g. of cracked wax olefins containing from 10 to 20 carbon atoms added at about 110° C., while maintaining the nitrogen atmosphere. External heating is removed, while the heat of polymerization maintains the refluxing. After about 45 minutes, during which refluxing was maintained, by external heating as necessary, the external heating is stopped and when the temperature drops to 100° C., isopropyl alcohol addition is begun until no further violent reaction occurs. Methanol is then added to precipitate the polymer, the supernatant liquid is discarded and the polymer is repeatedly washed with methanol and then with acetone. After repeatedly dissolving the polymer in benzene and precipitating with acetone, the polymer is isolated.

Example I

Into a reaction flask was introduced 10 g. of a polymer prepared as described in Example A having a viscosity at 210° F. ($V_{210}$) of 70 Saybolt Universal seconds (SUS) (2.8 weight percent in 130 neutral oil) as a 25 weight percent solution in benzene, 5 drops of chloroplatinic acid solution (10 weight percent in water) and 5 g. of dimethylchlorosilane and the mixture heated to about 65° C. At the end of 24 hours, external heating was removed, the solution filtered, and the polymer isolated and purified by dissolving twice in benzene and precipitating with acetone. The infrared spectrum of the product showed the almost complete absence of olefinic unsaturation and the typical $SiCH_3$ absorption.

Example II

Into a reaction flask was introduced 10 g. of polymer prepared as described above in Example A ($V_{210}=70$ SUS) as a 15 weight percent solution in benzene, 5 ml. of trichlorosilane and one drop of chloroplatinic acid hexahydrate catalyst solution and the mixture heated at 30° to 40° C. overnight. An aliquot of the resulting solution was evaporated on a salt plate and the infrared spectrum taken, indicating the almost complete absence of terminal double bond in the polymer.

Example III

Into a reaction flask was introduced 50 g. of a polymer derived from cracked wax olefins of from 15 to 20 carbon atoms ($V_{210}=61$ SUS) in benzene as a 30 weight percent solution, 5 drops of a 10 weight percent aqueous chloroplatinic acid solution and 25 ml. (0.4 mole) of trichlorosilane while maintaining a nitrogen atmosphere and the mixture refluxed for 6 hours. Solvent was stripped from the reaction mixture by heating the mixture on a steam plate and then 2 weight percent (based on polymer) of trichlorosilane added.

As indicated, various materials may be waterproofed with the compositions of this invention. Usually, the compositions of this invention may be applied to the host material in an amount of as little as 1 weight percent and generally not more than 5 weight percent based on the host material, in order to obtain the desired waterproofing. The waterproofing compositions of this invention may be applied to the host material by various means, either neat or in solution. Preferably, an inert diluent will be used such as volatile hydrocarbons or oxygenated organic compounds in which the polymers are soluble and the solvent does not react with a silylchloro group. Generally, concentrations from about 0.1 to about 10 weight percent of the polymer in the diluent will be used. The solutions may be applied by dipping, spraying, etc.

The compositions of this invention are particularly useful in the waterproofing of fabrics—cotton, wool, nylon, Dacron, etc.—but particularly cotton fabrics. The fabric may be impregnated with the polymers of this invention by dipping the fabric into a dilute solution of the polymer, e.g., from about 0.5 to 3 weight percent. The diluent may then be recovered by evaporating the diluent in a closed system. Generally, the compositions of this invention may be applied to fabric in as little as one weight percent to provide satisfactory waterproofing. Usually, from about 1.5 to 4 weight percent will be used in order to maintain the waterproofing through repeated dry cleanings or washings.

In order to demonstrate the excellent effectiveness of the compositions of this invention, the exemplary composition of Example II was dissolved in hexane and various concentrations and samples of cotton muslin cloth soaked in the solution and then allowed to dry at room temperature overnight. With the 2 percent solution, it was found that 52.4 sq. in. of muslin, weighing 5.6270 g., increased 0.1550 g. in weight (2.4 weight percent). The treated cloth was subjected to a variety of conditions, the cloth prior to and subsequent to treatment being tested according to the ASTM spray test D583–58. The following table indicates the results:

TABLE II

| Treatment | Wt. percent of Ex. II additive in solution | Spray rating [1] 74° F. | 105–110° F. |
|---|---|---|---|
| None | 1 | 100 | 100 |
| Treated 2 hrs. with $C_2Cl_4$ and $CCl_4$ | 2 | 100 | |
| Washed in 120° F. water containing commercial detergent | 2 | 80 | |
| Do | 1 | 70–80 | |

[1] 100 being completely waterproof.

The effect of repeated dry cleanings was then determined, preparing solutions of the additive of Example II of varying concentration and adding 2 weight percent (based on polymer) of trichlorosilane to prevent cross-linking of the polymer and immersing a swatch of muslin cloth in the solution and then allowing it to dry. The samples were tested by being immersed in tetrachloroethylene at room temperature. Also, the samples were washed at 130° F. in water containing 50 p.p.m. of a commercial detergent in a washing machine (going through the usual cycles). The following table indicates the results obtained:

TABLE III

| Sample, percent | Initial rating ASTM D 583-58 | Dry cleaning | | | Washing |
|---|---|---|---|---|---|
| | | 1st | 2nd | 3rd | |
| 1 | 100 | 100 | 90 | 90 | |
| 2 | 100 | 100 | 100 | 100 | 70 |
| 3 | 100 | | | | 70 |

It is evident from the above results that excellent fabric protection is obtained by employing extremely minute amounts of the compositions of this invention to be absorbed into a cotton fabric. Repeated treatments with halohydrocarbons do not significantly affect the waterproofing, while significant retention of waterproofing is obtained even under the drastic conditions of washing in hot water in the presence of a strong detergent. Moreover, the compositions of this invention can be used with a wide variety of other cellulosic materials as well as noncellulosic materials such as soil, construction materials, e.g., mud bricks, cinder bricks, etc.

As will be evident to those skilled in the art, various modifications on this invention can be made or followed, in the light of the foregoing disclosure and discussion, without departing from the spirit or scope of the disclosure or from the scope of the following claims:

I claim:

1. A method of waterproofing cotton and wool fabrics which comprises impregnating the said fabric with a dilute solution of a polymer having a molecular weight in the range of 100,000 to 1,000,000 and consisting of a plurality of units of the formula:

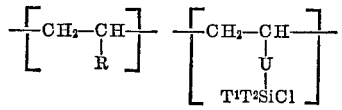

wherein $n$ is an integer of from 10 to 100, R is alkyl of from 6 to 20 carbon atoms, U is alkylene of from 3 to 18 carbon atoms, the silylchloro group being at least $\gamma$ to the backbone of the polymer and $T^1$ and $T^2$ are halogen of atomic number 17 to 35, lower alkyl or lower alkoxy.

2. A waterproof fabric prepared according to the method according to claim 1.

References Cited

UNITED STATES PATENTS 3,240,768   3/1966   Guenther _____ 260—88.1

JOSEPH L. SHOFER, Primary Examiner.

L. EDELMAN, Assistant Examiner.

U.S. Cl. X.R.

117—143, 148, 155, 138.8, 161; 260—88.2, 93.7, 94.7